ROTATING SHAFT DRIVEN CODE CONVERTER AND RECORDER

Filed March 31, 1964 8 Sheets-Sheet 1

INVENTORS
William D. Cohen
Miles Skrivanek. Jr.
BY S.C. Yuter
ATTORNEY

ROTATING SHAFT DRIVEN CODE CONVERTER AND RECORDER

ROTATING SHAFT DRIVEN CODE CONVERTER AND RECORDER

ROTATING SHAFT DRIVEN CODE CONVERTER AND RECORDER

ROTATING SHAFT DRIVEN CODE CONVERTER AND RECORDER

United States Patent Office 3,383,698

Patented May 14, 1968

3,383,698

ROTATING SHAFT DRIVEN CODE CONVERTER AND RECORDER

William D. Cohen, Syosset, and Miles Skrivanek, Jr., Glenwood Landing, N.Y., assignors to Digitronics Corporation, Albertson, N.Y., a corporation of Delaware Filed Mar. 31, 1964, Ser. No. 358,138
21 Claims. (Cl. 346—74)

ABSTRACT OF THE DISCLOSURE

A magnetic tape recording system which is suitable as an attachment to the ticket-issuing-machine drive shaft of a parimutuel betting totalizator, or to other intermittently operated rotary drives is described. Coupled to the machine drive shaft is a code disc which provides serial-by-bit data pulses in plural channels; the data correspond to the data imprinted on the issued ticket. The disc is driven in one-to-one relation. A motion conversion mechanism drives the take-up reel of the magnetic recorder and at reduced rotary speed and with non-linear motion, such that the data are recorded with optimum utilization of the tape. Included are means to assure irreversible motion of the take-up reel and of the code-disc to prevent recording of erroneous data or recording over desired data.

This invention relates to magnetic recording systems. More particularly, the present invention is directed to a system for recording digital data on magnetic tape which is normally at rest, and is in motion for relatively brief time intervals. During these time intervals the system must encode and record serially, preferably serially by bit, characters printed at rates compatible with human or machine operation and in synchronism with such operation.

The present invention will be described, by way of example only, in conjunction with the operation of the ticket issuing machine of the kind utilized for parimutuel betting at race tracks. However, the invention is not limited to this environment and has much wider application.

The ticket issuing machine may be deemed a part of a computing apparatus commonly used at race tracks, and known as a totalizator, which computes the winnings. To safeguard against the possibility of totalizator failure, and hence loss of betting records, the system of the present invention was devised. For this reason, the system is called a "fall back" recorder, in the sense that if all other records are lost, one may still "fall on," that is rely, on the magnetic tape record.

Such a ticket issuing machine is provided with a rotary shaft, which is effective to eject one ticket per shaft revolution. The shaft rotation is intermittent; it occurs only at the will of the operator, and when he prints data on the ticket. The data are in character form, usually in decimal digits, and as a minimum usually includes the number assigned to the horse picked by the bettor. To this end, the machine is typically provided with twelve keys corresponding to the decimal numbers 1 to 12. The keys are interlocked, so that operation of one precludes operation of the remainder.

Key operation effects printing on the ticket and at the same time sets in motion the ticket ejecting rotary shaft for one revolution. The recording system of the present invention is called on to accelerate the magnetic tape from rest, and to record in a code of the binary type and serially by bit, the printed horse-number, and then to decelerate the tape to rest again, in synchronism with the issuing operation. The invention objective met here is to utilize the magnetic tape as economically as possible, that is to avoid the situation of having long stretches of tape bearing no information.

The ticket issuing machine is usually provided with two additional key banks, one for printing the number of the race, and the other for printing numerical information having the significance of "win," "place" or show"; or whether the race pays "daily double" winnings. In the system of the present invention, the information corresponding to the second key bank is recorded, again serially by bit, on a second channel or track of the magnetic tape, and similarly for the information corresponding to the third key bank. The tracks are parallel to each other, and the three digits, although individually recorded serially by bit, are recorded parallel by digit or character.

In addition to the objective of economic utilization of the magnetic tape, the recording system of the present invention features direct attachability of the system to the ticket issuing machine with a minimum of modification of the machine structure. This feature permits integration of the system with ticket issuing machines already in operation.

A further object, and also a further feature of the invention is minimization of power requirements. The system of the invention draws no substantial current except when recording actually takes place, and then essentially solely the recording current. The mechanical drive for the tape is by way of mechanical coupling to the ticket issuing machine shaft, and imposes negligible mechanical load on the shaft.

Another feature of the invention is the provision of a rotary encoding disc which bears a pattern of conducting and non-conducting combinations which effect the desired serial-by-bit encoding, and the single pattern is used for the plural recording channels. This arrangement avoids the expense of, and the space and power consumption of intermediate data storage. The code disc is also driven by the ticket issuing machine shaft and imposes negligible mechanical loading on the shaft.

Further objects, advantages and novel features of the invention will appear in the course of the following, more detailed description, of which the appended claims form a part, considered together with the accompanying drawings, in which:

Figure 1:
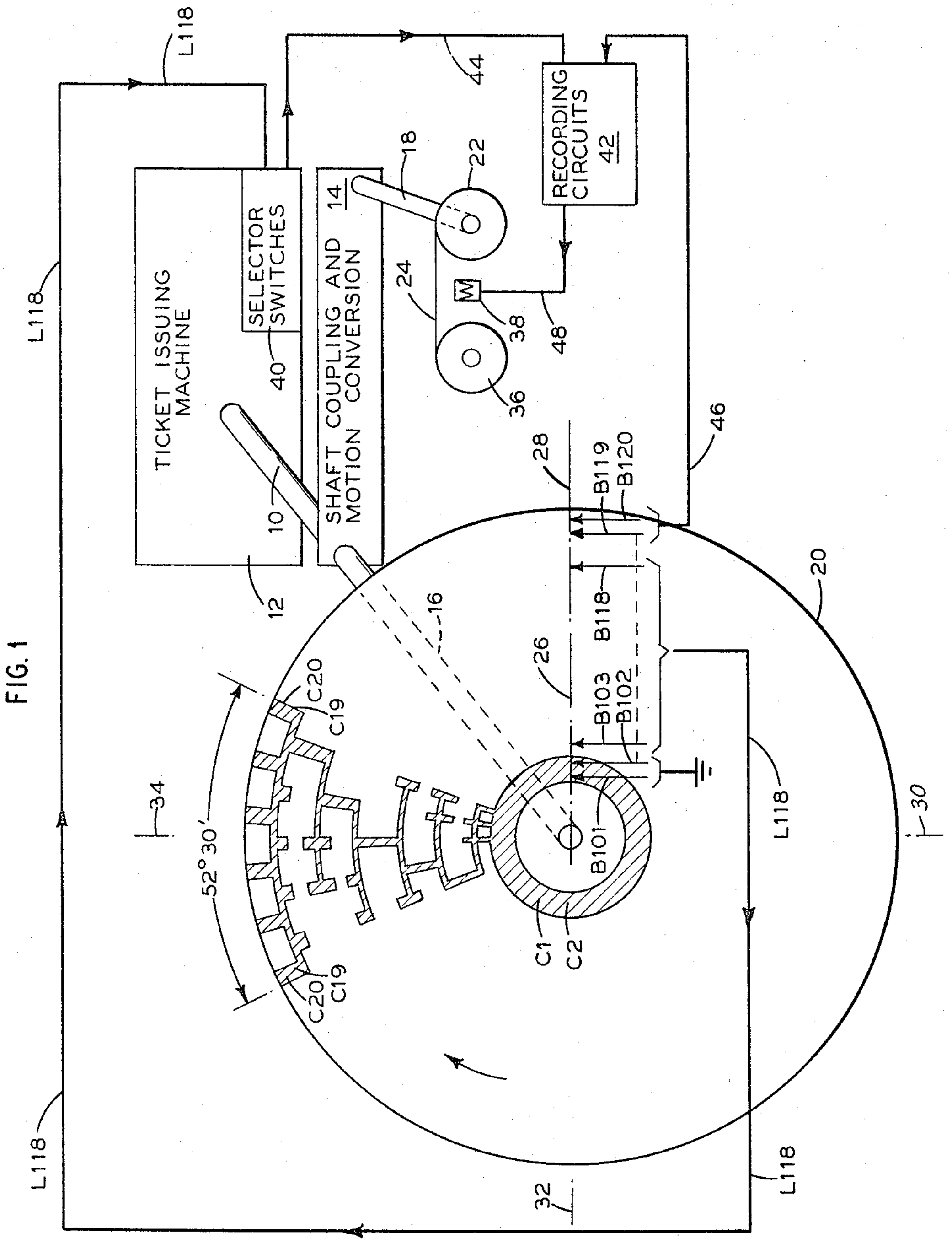
FIGURE 1 is a symbolic representation partly in block diagram form, of the organization of the system in accordance with a preferred embodiment of the invention.

Referring to FIGURE 1, the shaft 10 of the ticket issuing machine 12 is coupled by means of a shaft coupling and motion conversion device 14 to drive shafts 16 and 18. The shaft 16 drives the code disk 20, and the shaft 18 drives the take-up reel 22 of the magnetic tape 24.

The coupling of the shafts 10 and 16 is on a 1:1 basis, that is, the two shafts rotate at the same speed. For this reason, in other applications of the invention the two shafts could be unitory, and the motion conversion means 14, which leads to the shaft 18 could be coupled to the shafts 10 and 16 at any convenient point, not necessarily to the "rear" of the code disk 20.

The shaft 118 is driven in relation to the shaft 16 in the following manner. As the code disk 20 rotates clockwise from the indicated position with index line 26 on the disk in alignment with stationary index line 28, the shaft 18 accelerates from standstill. The index lines 26, 28, 30, 32 and 34 do not form part of the equipment but are presented here for convenience in description. The stationary index lines 28, 30, 32, and 34 are spaced 90° apart, in order.

The shaft 18 drives the take-up reel 22, drawing magnetic tape 24 from the supply reel 35 over magnetic recording heads 38. Initially, that is, with index line 26 moving away from index line 28, no recording takes place as yet. Recording commences at approximately 64° of rotation of shaft 16, when the leading edge of code pattern channels C20 and C19 reaches the index line 28 and respective stationary brushes B120 and B119, which are aligned with index line 28. This permits the magnetic tape 24 to come up to suitable recording speed. The shaft 18 attains its maximum speed with index lines 26, 30 in alignment. Recording has continued up to this point, and continues further for approximately 26° of rotation of shaft 16 beyond alignment of index lines 26 and 30. The shaft 18 is now decelerating and comes to a standstill when index lines 26 and 32 are in alignment. During the period of its motion, the shaft 18 has rotated through approximately 1/16 of a revolution. The speed characteristic of shaft 18 is that associated with a reciprocating mechanism, approximately sinusoidal. The shaft 18 dwells, that is, remains at standstill, while the shaft 16 completes its revolution, that is, from the instant where index line 26 is in alignment with index line 32, until index line 26 is in alignment with index line 28 once more. The ticket issuing machine 12 ejects one ticket for each revolution of the shaft 10 and 16.

It is appreciated that the specific figures for angular movement and displacement, the relative speed characteristic of shafts, etc. are given by way of example only. These factors may be appropriately selected for the particular application of the invention. These considerations shall apply also to the subsequent description.

The code pattern channels C20 and C19 are merely two of a set of twenty arcuate channels numbered C1 to C20, which are radially displaced from each other. The inner channels C1 and C2 are in effect a single channel and form a continuous ring. The outer channels C19 and C20 are in effect also a single channel. The intermediate channels are individual channels. The coding pattern configuration is described subsequently with reference to FIGURE 2.

In position for engagement with the channels C1 to C20, along index line 28, are respective brushes B101 to B120. The brushes B101 and B102 are at electrical reference potential, here ground potential. The intermediate brushes B103 to B118 are connected via individual conductors, indicated as a collective line L118 to the selector switches 40 in the ticket issuing machine 12. The conductors in line L118 carry the binary representations (serial by bit) of the numbers 0 to 15. Of these sixteen numerical representations, that one or more is transmitted from the selector switches 40 via line 44 to the recording circuits 42, for which the one or more selector switches 40 are set. If the selector switches 40 have only one key bank (switch bank), one bit pattern, derived from the code disk 20, will be transmitted via line 44. Usually, the selector switches 40 will include a second and a third key bank as stated in the introductory part of the specification, in which case three conductors within line 44 (now considered a collective line) will transmit serial bit patterns to the recording circuits 42. The bit patterns are in accordance with the setting of the switch banks 40.

The brushes B119 and B120 transmit "sprocket" pulses (a synchronizing pulse pattern) via line 46 directly to the recording circuits 42. The pulse patterns to be recorded are transmitted from the recording circuits 42 to the write heads 38 via collective line 48.

Figure 2:
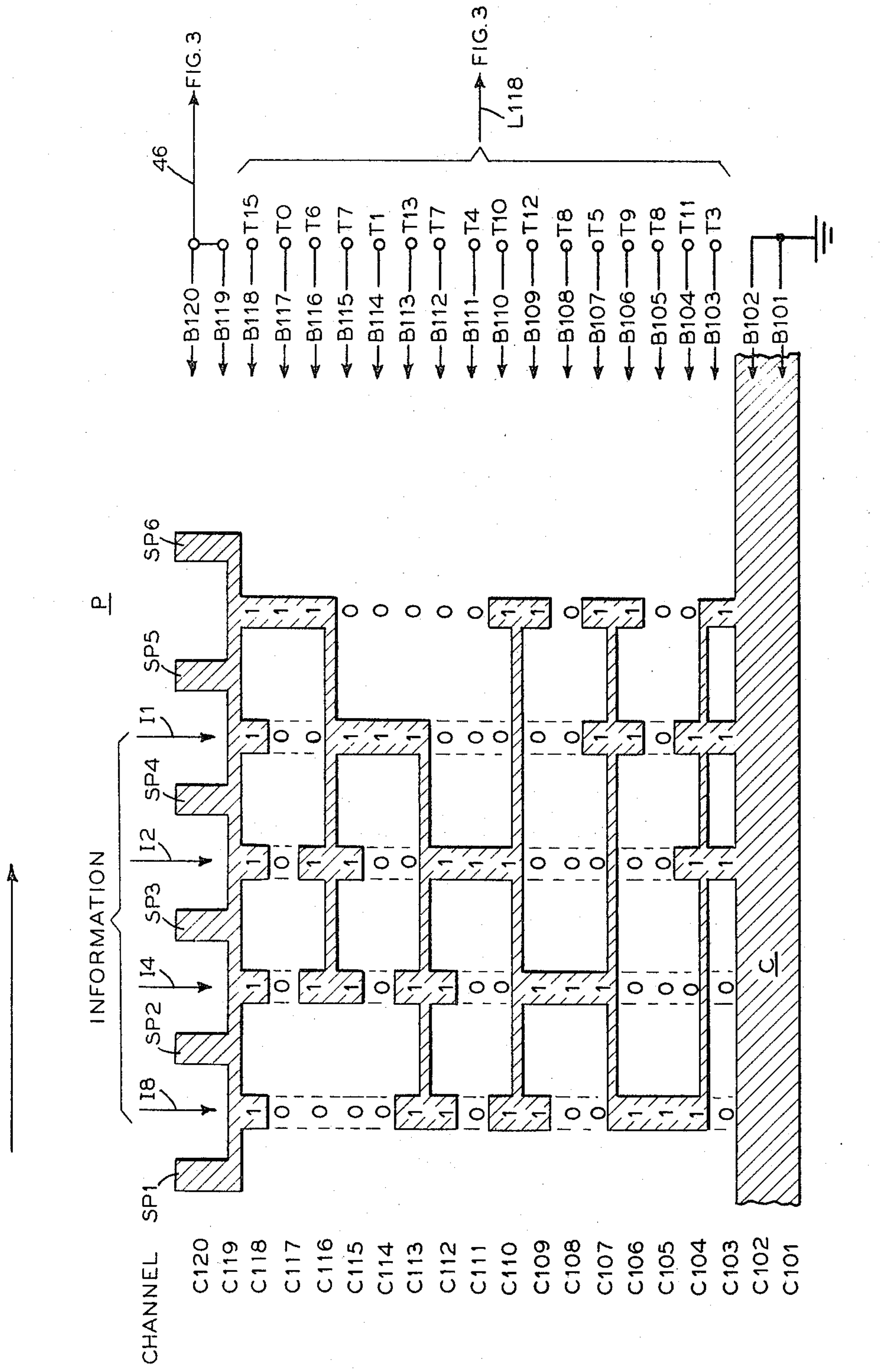
FIGURE 2 is a rectilinear development of the coding pattern of the code disc of FIGURE 1.

FIGURE 2 illustrates in rectilinear development the coding pattern of the disk 20. The channels C101 to C120 and their respective brushes B101 to B120 are arranged in horizontal rows. The channels are composed of non-conducting patterns and of conducting patterns; the latter are indicated as hatched areas. All such hatched areas are interconnected with each other and to the channels 101 and 102 which are in effect a single channel and form a common return C for the higher numbered channels. Unhatched portions are non-conducting areas. The coding pattern is also arranged in five vertical columns, of which the first four, I8, I4, I2 and I1, are information columns; the suffix numbers indicate the binary weight of the particular column. The remaining column P includes a parity bit; odd parity is used. The sprocket channels C119 and C120, which are in effect a single channel, have their coding pattern embraced in six columns, SP1 to SP6. The arrangement is such that sprocket columns alternate with information or parity bit columns, and since the pattern begins with the sprocket column SP1 to the left of the first information bit column I8, and the last sprocket column SP6 to the right of the parity bit column P, readout from the magnetic tape may be in either direction.

The coding pattern is self-evident from the illustration; the binary representations are indicated as ones for conducting areas and zeros for non-conducting areas. Considering the channel C107, for example, as the coding pattern reaches the brushes, the brush B107 will first be connected to ground via brushes B101 and B102 when the parity bit 1 reaches the brush; there is no connection to ground in any event in the spaces between columns. The next connection of brush B107 to ground takes place when information column I1 reaches the brush; there is no connection to ground in column I2; there is again connection to ground in column I4, and none in column I8. The brushes B103 to B118 are connected to terminals which are labeled T followed by a suffix number which indicates the value of the bit combination produced by the brush. In particular, the brush B107 produces the bit combination 0101, and therefore its terminal is labeled T5.

Figure 3:
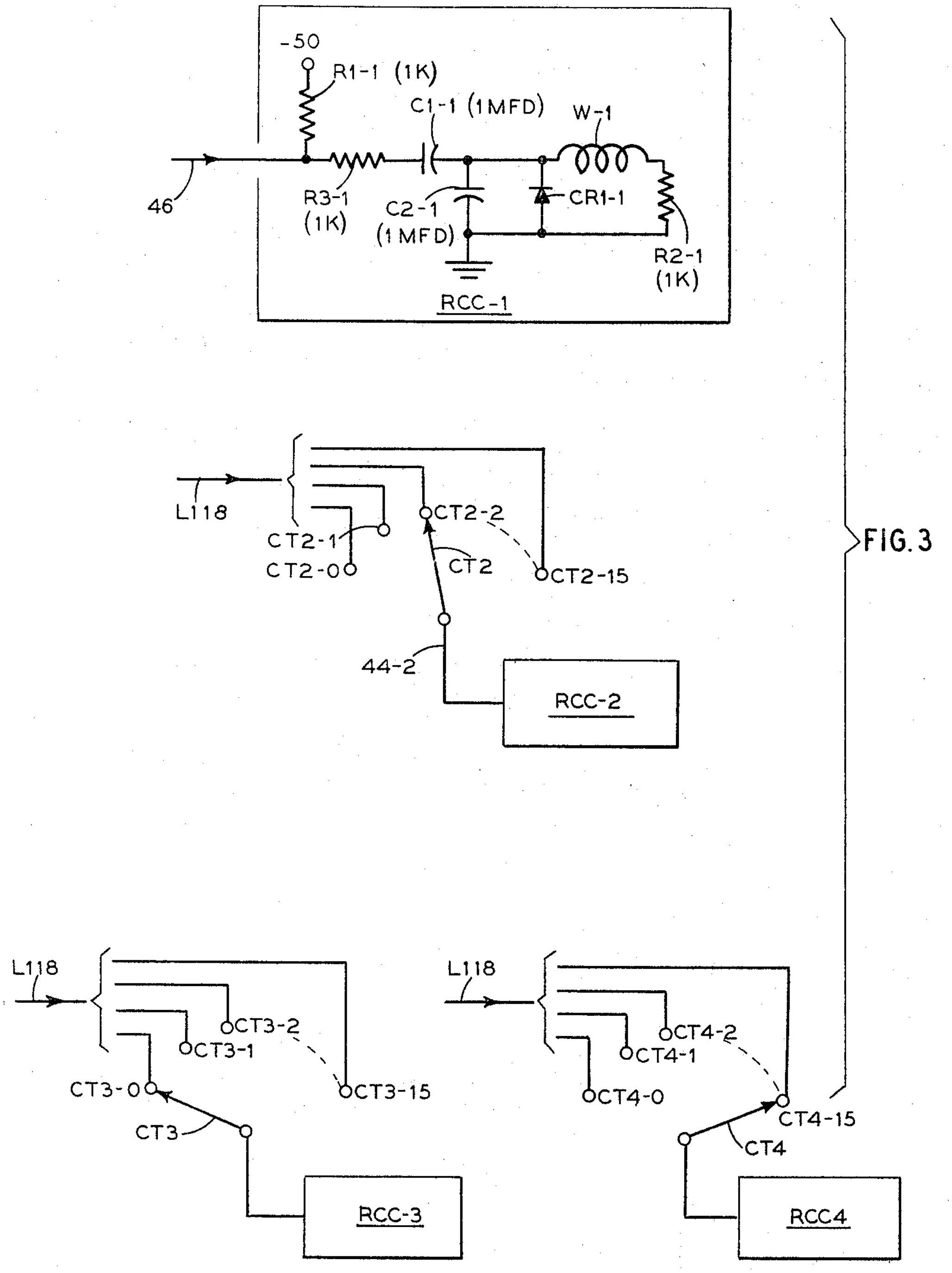
FIGURE 3 is a schematic drawing of the recording circuits.

The brushes B119 and B120 are connected together, thus constituting the channels C119 and C120 in effect a single sprocket channel, and are connected via line 46 to the recording circuits illustrated in FIGURE 3. The terminals T0 to T15 lead to the recording circuits of FIGURE 3 via line L118.

Referring to FIGURE 3, the sprocket pulse line 46 is seen to lead to a recording circuit RCC1 which is typical also for recording circuits RCC2 to RCC4. The circuit RCC1 is illustrated in detail, and the remaining recording circuits are identical, except that if desired, a diode CR1-1 within RCC1 may be omitted as not absolutely necessary.

Within the block RCC1, the electrical components are designated by reference characters and parenthetically by the nominal resistance or capacitance values given. The line 46 leads to the junction of resistors R1-1 and R3-1, whose other ends are respectively connected to a −50 volt supply and to a capacitor C1-1. The capacitor C1-1 is at its other end conected via capacitor C2-1 to ground. When the line 46 is disconnected from ground (refer again to FIGURE 2), the left plate of capacitor C1-1 will be charged by the supply potential −50. When the line 46 is grounded, the left plate of capacitor C1–1 tends to rise to ground potential. The resultant current pulse is transmitted to the write head W1 and then via resistor R2–1 to ground. It is this pulse which is recorded. To minimize undershoots of the recording pulse, a diode CR1–1 shunts the capacitor C2–1.

The collective line L118 (see also FIGURE 2) is fanned out to a series of switch bank terminals labeled CT2–0 to CT2–15 in correspondence with the terminals T0 to T15 of FIGURE 2. The movable switch arm CT2, which is set by the operator to the selected horse number, connects to the recording circuit RCC2 via line 44–2, which corresponds to line 46 of the recording circuit RCC1. To accommodate additional key switch banks the line L118 leads to additional switch terminals CT3–0 to CT3–15 whose movable contact CT3 is connected in similar fashion to the recording circuit RCC3. A similar repetition is in respect to a fourth recording circuit RCC4. Referring again to FIGURE 1, it should be noted that the rotational speed of the reel 22 is predetermined by the rotational speed of the shaft 10. The linear speed of the tape 24 on the other hand depends on the amount of tape already wound on reel 22. In practice, the speed of the tape 24, and hence its density of recording, undergoes a 2:1 variation between the extreme conditions of reel 22 at minimum winding and maximum winding. In readout, the first occurring sprocket pulse (see FIGURE 2) is ignored, and the remaining sprocket pulses lag the data bits, assuring that all data bits will have been safely stored. This allows for maximum tape skew, having regard specially to the 2:1 variation in tape feed.

Figure 4:
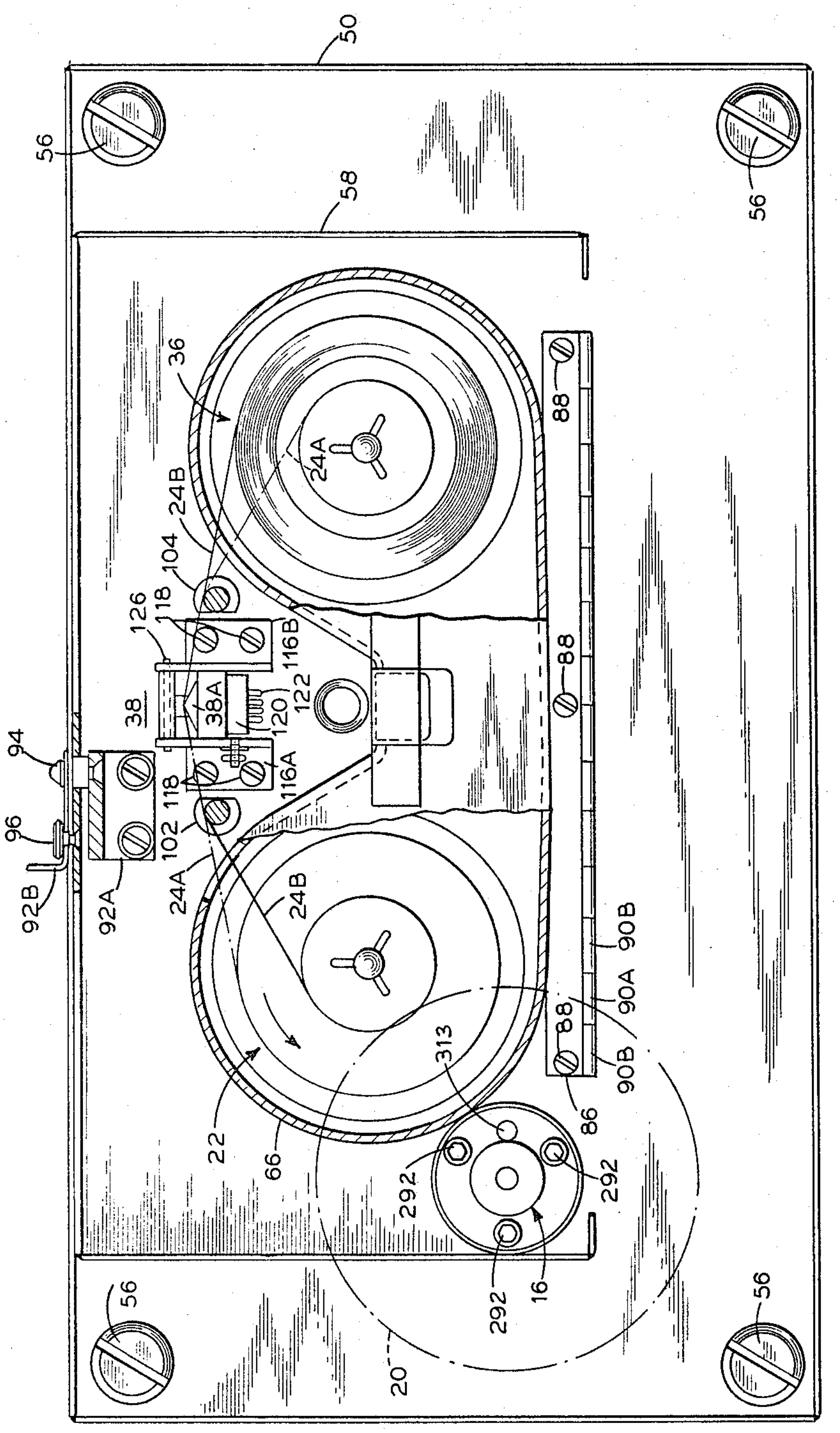
FIGURE 4 is a top plan view of a preferred mechanical configuration of the invention embodiment illustrated in FIGURES 1–3, the visible parts of FIGURE 4 being those seen when the structure of FIGURE 4 is attached to a console of the ticket issuing machine.

The mechanical structural configuration of the apparatus so far described schematically is illustrated in the remaining drawing figures. Referring to FIGURE 4, the "fall back" recorder, according to a preferred embodiment of the invention is illustrated as viewed when mounted on a console of the totalizator. The recorder assembly is mounted on a chassis 50, which is bolted to a console wall 52 (FIGURE 6) by means of four screw-threaded standoff members 54, which are in turn secured to the chassis 50 by means of threaded bolt-like members 56. The standoffs 54 which are threaded internally as at 54A and receive the externally threaded bolts 56, constitute together with the respective bolt 56 a fastening member which runs through the chassis 50 through receiving holes.

In the further description that now follows, the term "front" is intended to mean as seen by one viewing the chassis 50 mounted on the console 52. The "front most" member would be cover plate 58 as seen in FIGURE 6. By this definition, as seen in FIGURE 5, components illustrated as below the edge surface 50A of the chassis 50 would be in front of it, and elements illustrated as above the surface 50B would be to the rear of the chassis 50.

Figure 6:
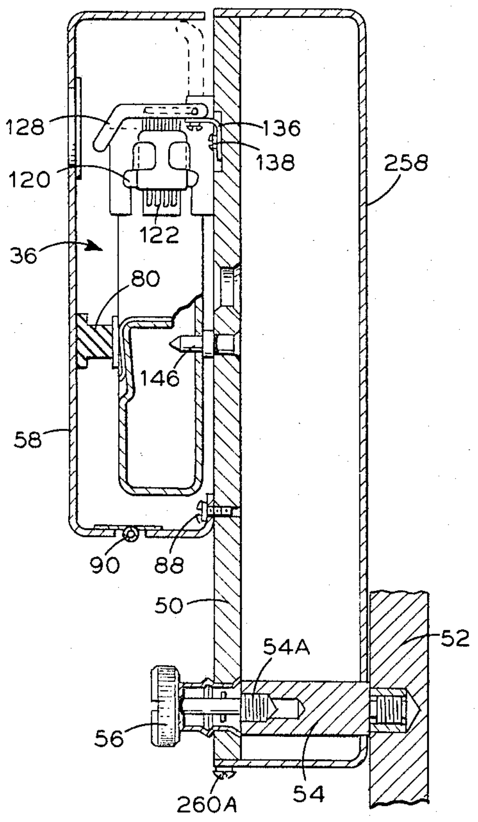
Figure 7:
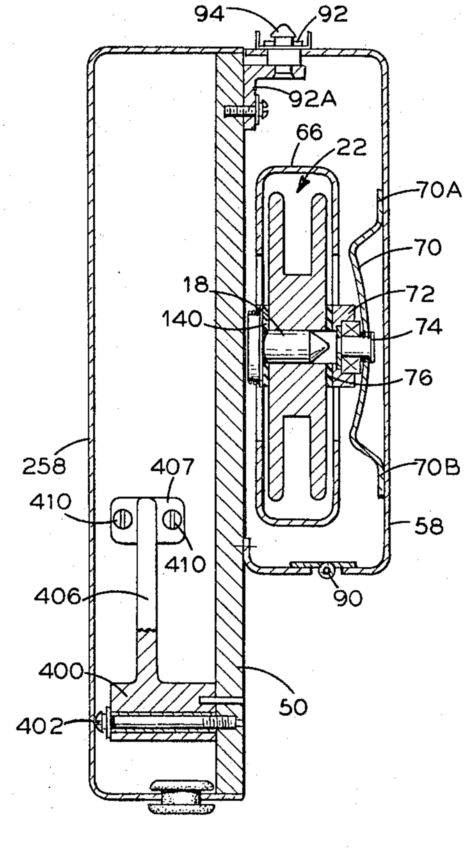

Major components projecting frontally of the chassis 50 are the code disk drive shaft 16, the take-up reel 22, the supply reel 36 and the recording head assembly 38. The magnetic tape take-up and supply reels 22 and 36 are housed within a tape cartridge unit 66 which is commercially available; this permits ready insertion and removal of both reels as a unit. Such a tape cartridge may be of the kind known as "Norelco." The cartridge and tape reels are urged firmly towards the chassis 50 by means of a pair of resilient members, one of which is shown in FIGURE 7 as element 70, bearing against the shaft of the supply reel. A similar resilient member is provided for the take-up reel 36 but is not shown. The elements 70 are in profile generally saddle-shaped with their ends 70A and 70B welded onto the inner surface of the cover 58, which for this reason is sometimes referred to as "weldment cover." The cover 58 encloses (see FIGURE 5) the elements located to the front of the chassis 50. Member 70 (see FIGURE 7) is provided at its center with a pressure pad element 72, which is secured to the member 70 by means of a suitable rivet 74. The member 72 is recessed along its center axis so as to receive the reel shaft 18. The element 72 is provided with a rubber pad 76 which physically engages the take-up reel 22, but with minimum of wear. A further urging member rubber stop element 80 (FIGURES 4 and 6) is secured to the undersurface of the weldment cover 50 and serves to aid in depressing the housing 66 against the chassis.

The cover 58 is hinged to the chassis 50 by means of a bracket 86 (see FIGURE 4) which is secured to the chassis by three fastening screws 88. The bracket 86 is provided with tubular hinged rod receiving members 90A, which are interleaved with similar members 90B secured to the surface of the cover 58 as by welding. Cooperating latching members, namely elements 92A and 92B are used to maintain the cover 58 firmly in place when the apparatus is in operation. The member 92A is bracketed onto the front side of the chassis and is provided with an element 94 which projects through a cutout in the cover 58 and receives the sliding latching member 92B, which is constrained to sliding motion by a knob 96 secured to the cover 58.

Figure 5:
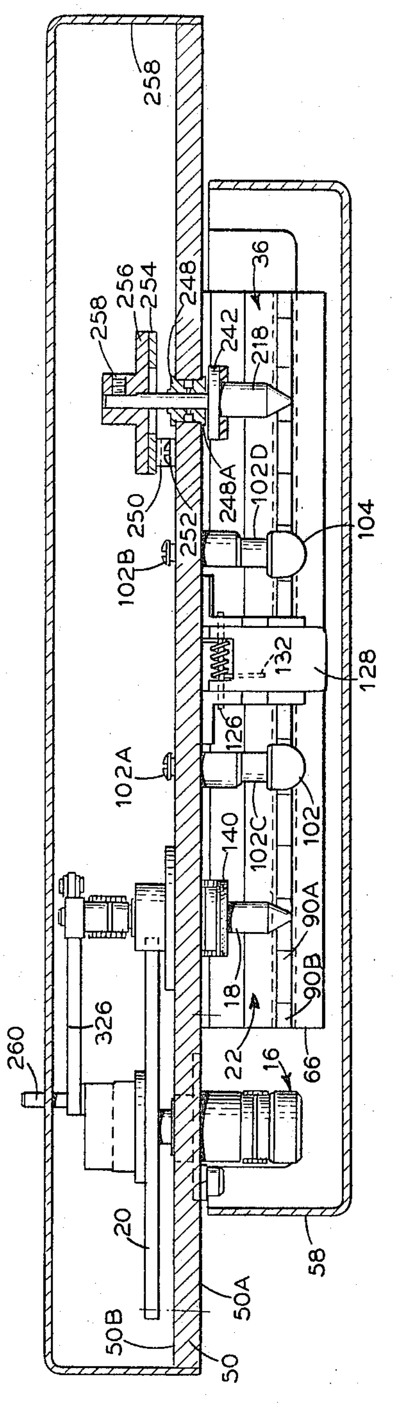
FIGURES 5, 6 and 7 are respectively front, right side, and left side elevational views of the structure of FIGURE 4 and are shown partly in section.

To continue the consideration of the components projecting frontally of the chassis 50 (FIGURES 4 and 5), the magnetic tape 24 is fed to and from the recording head assembly 38 with the aid of tape guides 102 and 104 which are secured to the chassis 50 by means of fastening screws 102A and 102B (see FIGURE 5). The tape guides 102 and 104 are reduced in diameter as at 102C and 102D to receive the magnetic tape. FIGURE 4 shows the magnetic tape in the two extreme winding conditions, the lines 24A indicating the condition where the take-up reel 22 is nearly fully wound and the supply reel nearly unwound; the lines 24B indicate the converse situation. As is indicated in FIGURE 4, the variation in diameter for these two conditions is approximately 2:1. The tape is inserted to pass adjacent to the recording heads 38A which are fastened to a bracket assembly including L bracket members 116A and 116B which are fastened to the chassis by means of screws 118. The recording head assembly is provided with a connector 120 having prongs 122 to which the electrical conductors may be soldered. A hinge pin 126 passes through the upstanding parts of the bracket members 116A and 116B and has hinged to it a cover member 128 (FIGURE 5). The latter serves to cover the recording heads 38 with the aid of a helical spring 130, which is wound loosely around the hinge pin 126 and engages at its end 132 the chassis surface 58 so as to urge the cover member 128 from the "open" dashed line position to the "closed" solid line position shown in FIGURE 6. A leaf spring 136 (FIGURE 6) is secured to the chassis by means of a fastening screw 138, which is one of four such screws by means of which the recording head assembly 38A is secured to the chassis. The leaf spring 136 further aids in urging of the cover member 128 to cover the recording head.

A lug 146 (FIGURE 6) is riveted onto the chassis and serves as an aid in properly seating the tape cartridge assembly 66 on the chassis; a second such lug 146 is provided for the take-up reel part but is not visible in FIGURE 7.

Figure 8:
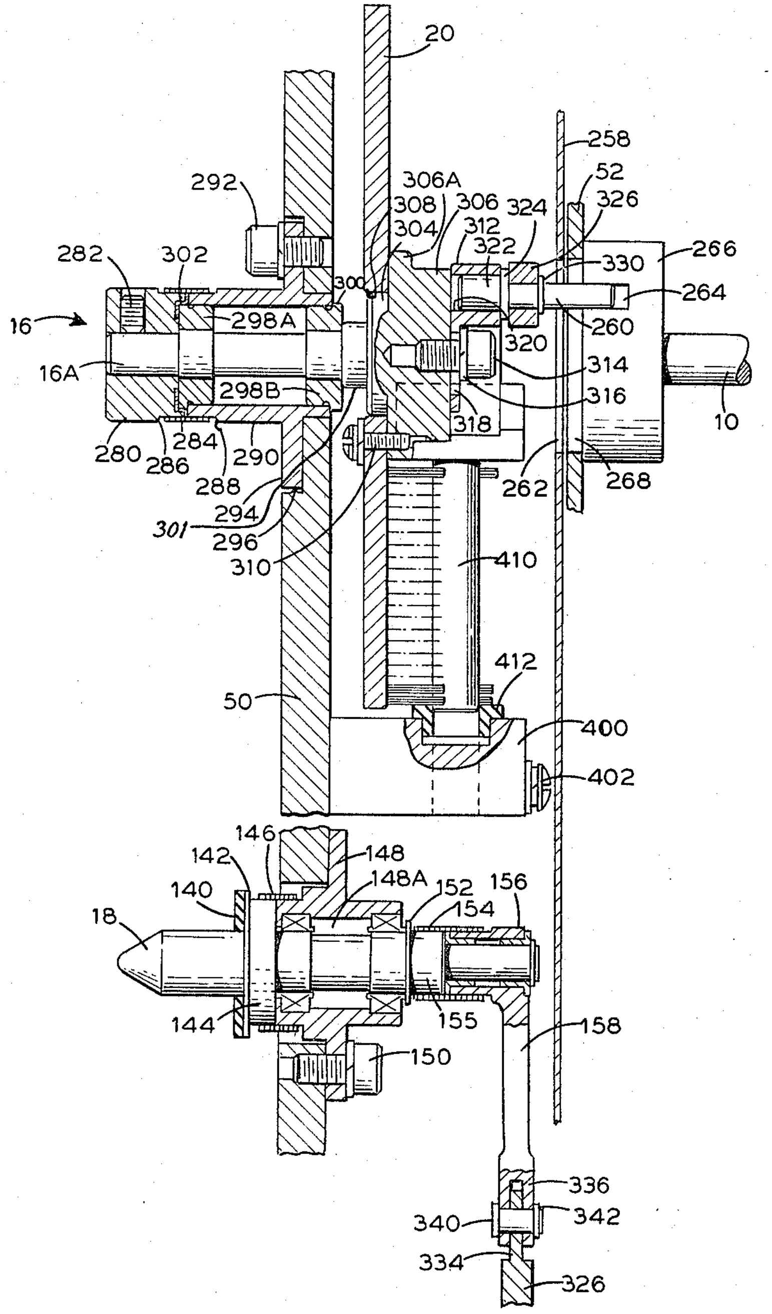
FIGURE 8 is an enlarged and partly fragmentary view of a portion of the structure illustrated in FIGURE 5 and is also shown in front elevation and partly in section.

To the extent that the reel shafts are similar, they will be described with reference to the take-up reel shaft and spindle 18 (FIGURES 5, 7 and 8). Specific differences will be pointed out by describing them with reference to the supply reel and spindle shaft 218 (FIGURE 5). The description of the take-up reel drive may be best seen in FIGURE 8, but the other mentioned figures should also be referred to. In the description of the drive it may be assumed that the parts mentioned are rotatable in unison with the shaft or spindle 18 proper, unless otherwise specified or clear from the context.

The shaft 18 is provided with a collar-like rubber pressure pad 140 which is similar to the pad 76. The pad 140 is glued onto a collar 142. The collar 142 is appreciably thinner than the corresponding collar 242 of the supply reel, because of the immediately described components associated with the take-up reel but lacking in the supply reel. To the rear of the collar 142, the shaft 18 is formed to another collar or disk 144 of somewhat lesser diameter, so that the collar 142 may be urged by a helical spring 146 which surrounds the disk 144 and bears against the collar 142. The spring 146 bears at its rearward end against shouldered surface of a stationary bearing assembly 148, which is secured to the chassis 50 by means of fastening screws 150, of which only one is visible in FIGURE 8 although three are in fact provided. The spring 146, by virtue of its just-described cooperation with the collar 142, and bearing assembly 148, acts as a "brake" spring in the sense that it prevents rotation in the reverse direction, which if permitted might result in loss of recorded data by recording twice on the same tape location. The spring 146, which is rotatable in unison with the shaft 18, is thus a ratchet action or anti-backlash device.

The bearing assembly 148 includes the bearing member 148A proper which is penetrated by the shaft 18. To the rear of the assembly 148, the shaft 18 is provided with a further ratchet action or anti-backlash arrangement which includes collar-like washer 152 against which is urged a further helical spring 154 which surrounds a disk portion 155 of the shaft. The latter spring bears at its other end against a shouldered axial bearing member 156 through which the shaft 18 penetrates. The bearing member 156 in this instance is not stationary, but is integral with a connecting rod 158 which receives reciprocating motion from the code disk shaft 16. The connecting rod 158 is thus part of the motion conversion means 14, FIGURE 1. In operation, the rod 158 will undergo reciprocating motion, and the provision of the elements 152, 154 and 156 assures that the shaft 18 will rotate uni-directionally, that is, during the forward stroke of the rod 158, and will remain stationary during the return stroke.

The ratchet-like, anti-backlash means including the helical spring 146 and the helical spring 154 assures solely forward motion of the tape, as stated. However, these anti-backlash means serve an additional purpose, namely preventing motion transmission from the shaft 18 to the reciprocating rod 158, even in the preferred forward direction of the tape. Such attempted forward motion might occur by carelessness in assembly, for example, or for any other reason. If this motion were permitted to propagate via the connecting rod 158 to the code disk, there might result a space and time displacement of the period within a code disk revolution, during which encoding takes place. It may be recalled from previous description that the encoding period takes place during a definite part of the code disk revolution. Thus the motion conversion means including the connecting rod 158 assures not only solely forward movement of the tape, but also uni-directional in the further sense that motion transmission from the take-up reel shaft to the code disk is prevented. The further description of the motion transmission is given with reference to the code disk drive.

The supply reel shaft 218 (FIGURE 5) is provided with a bearing collar 248 which is provided with a flange-like annular part 248A which bears against the front surface 50A of the chassis. The shaft is urged to the bearing position by means of a leaf spring 250 which is fastened to the chassis surface 50B by means of a screw 252. The spring 250 urges a rubber pressure pad 254, which is coupled to the shaft 218 for unitary motion by means of a shouldered collar 256 through which the shaft 218 proper penetrates. However, the elements 254 and 256 are coupled to the shaft 218 for unitary motion by means of a set screw 258. The shaft assembly 218 is axially slidable in the forward direction from the indicated position by application of force against the urging force of the leaf spring 250 to permit ready removal of the tape cartridge.

In FIGURES 5, 6, and 7 it may be seen that the components to the rear of the chassis 50 are enclosed by means of a rear cover 258 which is secured to the chassis side walls by a series of fastening screws 260A of which one is visible in FIGURE 6. It is the rear cover 258 which physically bears against the ticket issuing machine console wall 52, as may be seen in FIGURE 6, and attachment is by means of the threaded standoffs 54 previously mentioned. As may be seen in FIGURES 5 and 8, the rear cover 258 is penetrated by an eccentric pin 260, which, as may best be seen in FIGURE 8, is coupled ultimately to the code disk shaft 16, and rotates about the axis of the shaft 16 in unison therewith. The rear cover 258 is provided with an opening 262 (FIGURE 8) so as to permit the pin 260 to perform its rotation about the shaft axis with sufficient clearance. The pin 260 projects into a likewise eccentric recess 264 of a disk 266 which is secured to the shaft 10 of the ticket issuing machine, the shafts 10 and 16 being coaxial. The ticket issuing machine console 52 is provided with an opening 268 coextensive with opening 262, and for the same purpose. The pin 260 serves not only as the beginning of the motion conversion part of the unit 14 of FIGURE 1, but also as the shaft coupling part of the unit 14.

Figure 9:
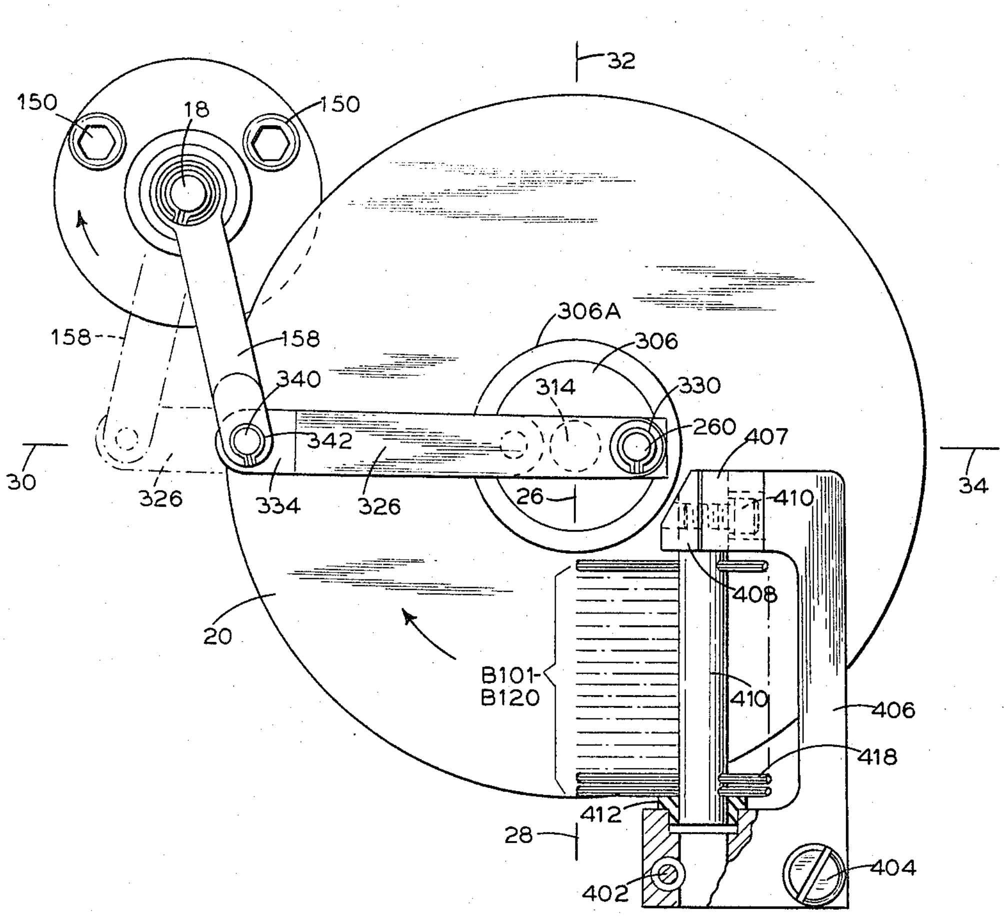
FIGURE 9 is an enlarged plan view of the code disk, brush assembly and motion conversion mechanism, corresponding to part of FIGURE 8, and represents certain parts not visible in FIGURE 4.

The description of the code disk 20, its drive, the motion conversion mechanism 14, and the brush assembly, is best seen with reference to FIGURES 8 and 9, but reference should be made concurrently to FIGURE 5 principally, and to some lesser extent to FIGURES 4 and 7.

As in the description o fthe magnetic tape reel drives, it may be assumed that the parts associated with the shaft 16 are rotatable in unison with the shaft unless otherwise specified or clear from the context. Proceeding again from front to rear in FIGURE 8, the code disk drive 16 includes the drive shaft 16A proper which penetrates a bearing collar 280 which is secured to the shaft by means of a set screw 282. The collar 280 is reduced so as to receive a helical anti-backlash spring 284, which bears against the shouldered portion 286 of the collar at one end. Towards its other end the spring 284 urges against a shouldered surface 288 of a stationary tubular bearing member 290. The latter is secured to the chassis 50 by means of fastening screws 292 of which three are provided (see FIGURE 4). To this end, the bearing housing 290 is provided with a widened base 294 which fits into a recess 296 of the chassis 50. The attachment by screws 292 is at the base part of the bearing housing 290.

Within the bearing housing 290, and towards its axial ends, are located two stationary annular bearing members 298A and 298B, which are penetrated by the shaft 16. The bearing members 298 are shouldered at their outer ends as at 300 and 302, and are brought to bear against the rear side of the chassis 50 (at 300) and against the front end of the bearing housing 290 and also the rear surface of the collar 280 at 302. The shaft 16A is formed to a boss 301 to the rear of the bearing member 298B, the parts 300 and 301 being in bearing engagement. In this manner the shaft 16 is axially maintained in position while free to rotate. To the rear of the boss 301 the shaft assembly 16 is provided with additional parts 304 and 306 of successively larger diameter. The code disk 20 is provided with a through opening 308 through which the part 304 penetrates, and is attached to the part 306 by three fastening screws 310, of which only one is visible in FIGURE 8. The part 306 has a shouldered portion 306A which actually bears against code disk 20. To facilitate assembling and also permit inspection, a through hole 313 (FIGURE 4) is provided; it extends through the bearing housing base 294 and chassis 50. The hole 312 is located such that the fastening screws 310 (FIGURE 8) are visible as the code disk 20 is rotated. The shaft part 306 is slotted diametrically towards its rear end and within the slot is received a generally L-shaped pin supporting member 312, which is fastened to the part 306 by means of a fastening screw 314 and washer 316. The member 312 is provided with an opening 318 for this purpose, the screw 314 penetrating the washer 316, opening 318 into a threaded recess of the part 306. The opening 318 is appreciably enlarged to permit adjustable axial positioning of the bracket 312.

The pin supporting bracket 312 has a through opening 320 into which is tightly fitted a widened front part 322 of the pin 260. To the rear of the part 322, the pin 260 is formed to a boss part 324 of still greater diameter. An eccentric coupling rod 326 (shown fragmentarily in the upper part of FIGURE 8 and also in its lower part; see also FIGURE 9) is penetrated by the pin 260 proper; it is seated at its front end surface against the boss 324, and at its rear surface bears against a washer 330 which fits tightly around the pin 260 and rotates in unison therewith.

Referring to the lower part of FIGURE 8 and also to FIGURES 5 and 9, the connecting link 326 is of reduced thickness at its end 334, which is remote from the end adjoining the pin 260. The end 334 is pivotally fitted within the bifurcated end part 336 of the connecting rod 158; a rivet 340 penetrates parts 334 and 336; the rivet is in tight engagement with the bifurcated part 336 but serves as a pivot for the part 326. A washer 342 is tightly fitted over the rear end of the rivet 340 and moves in unison with the rivet and connecting rod 158.

Referring to FIGURE 9, the cycle of the code disk 20 and of the magnetic tape take-up reel 22 is again indexed by the index lines 26 to 34, and the code disk is again shown as at the beginning of a revolution of the ticket issuing machine shaft 10. For this initial position the connecting links 326 and 158 are shown in solid lines. This initial position (index lines 26 and 28 in alignment) may be termed the right dead center position, in which the connecting link 326 is in alignment with index line 30. It will be recalled that the tape motion begins at this instant, and ends as index line 26 is aligned with index line 32. This latter position is indicated in broken lines in FIGURE 9, and may be termed the left dead center position. In traveling from the right dead center position to the left dead center position, the link 326, following the general motion of the code disk 20, its first bodily moved in the general direction towards index line 28; it approaches index line 28 most closely at the instant the index lines 26 and 30 are in alignment, that is, at the instant of maximum tape speed. Thereafter the link 326 recedes towards the left dead center position, wherein the link 334 is in alignment with index line 30. As the code disk 20 completes its revolution (index line 26 moving from alignment with index line 32 back to alignment with index line 28), the connecting links 158 and 326 will recover to the right dead center position. The link 158 simply retraces its previous movement. The link 326 is first moved in the general direction towards index line 32 and approaches it most closely and at maximum speed when index lines 26 and 34 are in alignment. Thereafter, the link 326 recedes to the right dead center position. During the period of recovery of the links 158 and 326, magnetic tape movement, is arrested by the described ratchet-like anti-backlash features of construction.

Figure 9A:
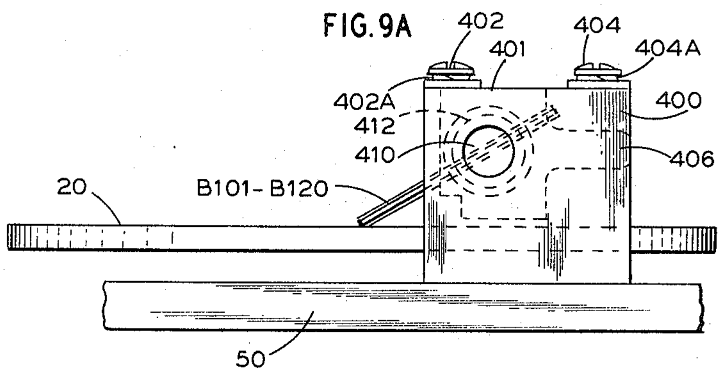
FIGURE 9A is an elevational view of the brush assembly of FIGURE 9 and illustrates certain parts also not visible in FIGURE 4 and illustrated only partly in FIGURE 7.

The combination of the connecting links 158 and 326, together with eccentric pin 260 constitutes generally the motion conversion mechanism 14 of FIGURE 1, and the coupling of shafts 10 and 16 has been previously described. This now leaves for consideration the structural arrangement of the code disk contact brush assembly which is given with reference to FIGURES 8, 9, and 9A and to lesser extent FIGURE 7.

The brush assembly is mounted on the chassis 50 by means of an upstanding brush support 400 (FIGURE 9A) which is secured to the chassis by means of through running fastening screws 402 and 404 which are provided with suitable washers 402A and 404A. Integrally formed with the block and extending laterally therefrom is a yoke-like member 406 which is cantilevered onto the block 400, that is, suspended above the code disk 20 (FIGURE 9) so as to permit free rotation of the latter. The block 400 and yoke 406, considered together, are generally U-shaped as shown; moreover (see also FIGURE 7), at the end 407 remote from the block 400, the U is completed by a part 408 which is secured to the yoke 406 by means of fastening screws 410. The parts 407 and 408 rise above the yoke 406 proper to about the same height as the upper surface 401 of the block 400, and fall below the level of the yoke 406 proper to a height just clearing the code disk 20. The parts 407 and 408 are given the just-described geometry by reason of the fact that they act like a vise-like clamp for a spindle-like insulating member 410 which fits into semi-cylindrical recesses of the parts 407 and 408 at its one end, and into a shouldered collar-like receiving member 412 at its other end, the latter together with the member 410 being fitted into a receiving recess within the block 410. The brushes B101 and B120 extend through the insulating member 410; each brush is made of plural bristles of resilient, conductive material. The brushes are inclined with respect to the plane of the code disk 20 at an angle of approximately 30°; the provision of the spindle 410 permits fine adjustment of the appropriate brush pressure. To the brush ends remote from the code disk 20, such as at 418, suitable electrical conducting wires may be conveniently soldered; these wires provide the connections designated as L118 and 46 in FIGURE 1.

The described embodiment of the invention, both in the general form shown in FIGURES 1–3, and in the specific structural configuration shown in the remaining drawing figures, meets the objectives stated in the introductory part of the specification. By these embodiments a reliable and inexpensive "fall back" recorder has been provided which is readily integrated with existing ticket issuing machines already in operation. On the basis of the described embodiments, there will be apparent to those skilled in the art various modifications which do not essentially depart from the true scope and spirit of the invention, and which are intended to be embraced within the invention.

What is claimed is:

1. As an attachment to an apparatus having a rotary drive shaft which is normally driven intermittently and for a limited number of revolutions at a time, and further having at least one bank of character-corresponding-selector keys:
   - a magnetic tape recording system comprising:
   - a magnetic tape take-up-reel shaft, a magnetic tape supply-reel shaft,
   - a rotary code disk having thereon plural channels located in concentric circles in the form of angularly-spaced conducting patterns and nonconducting patterns constituting coded bit combinations corresponding to selector key characters,
   - a channel-engaging electrical contact brush per each channel, each brush to be connected to a respective selector key in a given bank,
   - a rotary drive shaft for said code disk, couplable to and to be driven by the apparatus drive shaft, and
   - motion conversion means intercoupling said code disk drive shaft and the take-up reel shaft, for irreversibly rotating the take-up reel shaft through a fraction of one revolution as the code disk is driven through a full revolution.

2. As an attachment to an apparatus having a rotary drive shaft which is normally driven intermittently and for a limited number of revolutions at a time, and further having at least one bank of character-corresponding-selector keys:
   - a magnetic tape recording system comprising:
   - a magnetic tape take-up-reel shaft, a magnetic tape supply-reel shaft, and therebetween a magnetic recording head,
   - a rotary code disk having thereon plural information channels located in concentric circles in the form of angularly-spaced conducting patterns and non-conducting patterns constituting coded bit combinations corresponding to selector key characters, and a further channel in the form of a concentric circular closed ring-conducting pattern which is interconnected to the conducting patterns in the information channels, a channel-engaging electrical contact brush per each information channel, each brush to be connected to a respective selector key in a given bank, and a further brush in engagement with the closed ring channel, a rotary drive shaft for said code disk, couplable to and to be driven by the apparatus drive shaft, motion conversion means intercoupling said code disk drive shaft and the take-up reel shaft, for irreversibly rotating the take-up-reel shaft through a fraction of one revolution as the code disk is driven through a full revolution, and a recording circuit connectable to the recording head and to the closed ring brush and to the selector key bank, for recording on magnetic tape the bit pattern corresponding to a selected key in timed relation with the apparatus drive shaft rotation.

3. As an attachment to an apparatus having a rotary drive shaft which is normally driven intermittently and for a limited number of revolutions at a time, and further having at least one bank of character-corresponding-selector keys:

a magnetic tape recording system comprising:

a magnetic tape take-up-reel shaft, a magnetic tape supply-reel shaft, a rotary code disk having thereon plural channels located in concentric circles in the form of angularly-spaced conducting patterns and nonconducting patterns constituting coded bit combinations corresponding to selector key characters, a channel-engaging electrical contact brush per each channel, each brush to be connected to a respective selector key in a given bank, a rotary drive shaft for said code disk, couplable to and to be driven by the apparatus drive shaft, reciprocating mechanism intercoupling said code disk drive shaft and the take-up-reel shaft, for irreversibly and uni-directionally rotating the take-up-reel shaft through a fraction of one revolution as the code disk is driven through a full revolution.

4. As an attachment to an apparatus having a rotary drive shaft which is normally driven intermittently and for a limited number of revolutions at a time, and further having at least one bank of character-corresponding-selector keys:

a magnetic tape recording system comprising:

a magnetic tape take-up-reel shaft, a magnetic tape supply-reel shaft, and therebetween a magnetic recording head, a rotary code disk having thereon plural information channels located in concentric circles in the form of angularly-spaced conducting patterns and nonconducting patterns constituting coded bit combinations corresponding to selector key characters, and a further channel in the form of a concentric circular closed ring conducting pattern which is interconnected to the conducting patterns in the information channels, a channel-engaging electrical contact brush per each information channel, each brush to be connected to a respective selector key in a given bank, and a further brush in engagement with the closed ring channel, a rotary drive shaft for said code disk, couplable to and to be driven by the apparatus drive shaft, reciprocating mechanism intercoupling said code disk drive shaft and the take-up-reel shaft, for irreversibly through a fraction of one revolution as the code disk is driven through a full revolution, and a recording circuit connectable to the recording head and to the closed ring brush and to the selector key bank, for recording on magnetic tape the bit pattern corresponding to a selected key in timed relation with the apparatus drive shaft rotation.

5. As an attachment to an apparatus having a rotary drive shaft which is normally driven intermittently and for a limited number of revolutions at a time, and further having at least one bank of character-corresponding-selector keys:

a magnetic tape recording system comprising:

a magnetic tape take-up-reel shaft, a magnetic tape supply-reel shaft, a rotary code disk having thereon plural channels located in concentric circles in the form of angularly-spaced conducting patterns and nonconducting patterns constituting coded bit combinations corresponding to selector key characters, a channel-engaging electrical contact brush per each channel, each brush to be connected to a respective selector key in a given bank, a rotary drive shaft for said code disk, couplable to and to be driven by the apparatus drive shaft, including anti-backlash means for preventing code disk drive shaft rotation in the reverse direction, reciprocating mechanism intercoupling said code disk drive shaft and the take-up-reel shaft for irreversibly and uni-directionally rotating the take-up-reel shaft through a fraction of one revolution as the code disk is driven through a full revolution.

6. As an attachment to an apparatus having a rotary drive shaft which is normally driven intermittently and for a limited number of revolutions at a time, and further having at least one bank of character-corresponding-selector keys:

a magnetic tape recording system comprising:

a magnetic tape take-up-reel shaft, a magnetic tape supply-reel shaft, and therebetween a magnetic recording head, a rotary code disk having thereon plural information channels located in concentric circles in the form of angularly-spaced conducting patterns and non-conducting patterns, each channel constituting a unique serial-by-bit combination corresponding to a particular selector key character, and a further channel in the form of a concentric circular closed ring conducting pattern which is interconnected to the conducting patterns in the information channels, a channel-engaging electrical contact brush per each information channel, each brush to be connected to a respective selector key in a given bank, and a further brush in engagement with the closed ring channel, a rotary drive shaft for said code disk, couplable to and to be driven by the apparatus drive shaft, motion conversion means intercoupling said code disk drive shaft and the take-up-reel shaft, for irreversibly rotating the take-up-reel shaft through a fraction of one revolution as the code disk is driven through a full revolution, and a recording circuit connectable to the recording head and to the closed ring brush and to the selector key bank, for recording on magnetic tape serially by bit the bit pattern corresponding to a selected key in timed relation with the apparatus drive shaft rotation.

7. As an attachment to an apparatus having a rotary drive shaft which is normally driven intermittently and for a limited number of revolutions at a time, and further having at least one bank of character-corresponding-selector keys:

a magnetic tape recording system comprising:

a magnetic tape take-up-reel shaft, a magnetic tape supply-reel shaft, and therebetween a magnetic recording head, a rotary code disk having thereon plural information channels located in concentric circles in the form of angularly-spaced conducting patterns and non-conducting patterns, each channel constituting a unique serial-by-bit combination corresponding to a particular selector key character, and a further channel in the form of a concentric circular closed ring conducting pattern which is interconnected to the conducting patterns in the information channels, a channel-engaging electrical contact brush per each information channel, each brush to be connected to a respective selector key in a given bank, and a further brush in engagement with the closed ring channel, a rotary drive shaft for said code disk, couplable to and to be driven by the apparatus drive shaft, reciprocating mechanism intercoupling said code disk drive shaft and the take-up-reel shaft, for irreversibly and uni-directionally rotating the take-up-reel shaft through a fraction of one revolution as the code disk is driven through a full revolution, and a recording circuit connectable to the recording head and to the closed ring brush and to the selector key bank, for recording on magnetic tape serially by bit the bit pattern corresponding to a selected key in timed relation with the apparatus drive shaft rotation.

8. As an attachment to an apparatus having a rotary drive shaft which is normally driven intermittently and for a limited number of revolutions at a time, and further having at least one bank of character-corresponding-selector keys:

a magnetic tape recording system comprising:

a magnetic tape take-up-reel shaft, a magnetic tape supply-reel shaft, and therebetween a magnetic recording head, a rotary code disk having thereon plural information channels located in concentric circles in the form of angularly-spaced conducting patterns and nonconducting patterns, each channel constituting a unique serial-by-bit combination corresponding to a particular selector key character, and a further channel in the form of a concentric circular closed ring conducting pattern which is interconnected to the conducting patterns in the information channels, a channel-engaging electrical contact brush per each information channel, each brush to be connected to a respective selector key in a given bank, and a further brush in engagement with the closed ring channel, a rotary drive shaft for said code disk, couplable to and to be driven by the apparatus drive shaft, including anti-backlash means for preventing code disk drive shaft rotation in the reverse direction, reciprocating mechanism intercoupling said code disk drive shaft and the take-up-reel shaft, for irreversibly and uni-directionally rotating the take-up-reel shaft through a fraction of one revolution as the code disk is driven through a full revolution, and a recording circuit connectable to the recording head and to the closed ring brush and to the selector key bank, for recording on magnetic tape serially by bit the bit pattern corresponding to a selected key in timed relation with the apparatus drive shaft rotation.

9. As an attachment to an apparatus having a rotary drive shaft which is normally driven intermittently and for a limited number of revolutions at a time, and further having at least one bank of character-corresponding-selector keys:

a magnetic tape recording system comprising:

a magnetic tape take-up-reel shaft, a magnetic tape supply-reel shaft, and therebetween a magnetic recording head, a rotary code disk having thereon plural information channels located in concentric circles in the form of angularly-spaced conducting patterns and nonconducting patterns, each channel constituting a unique serial-by-bit combination corresponding to a particular selector key character, a concentrically located "sprocket" channel having conducting patterns which are angularly interspersed with the bits in the information channels, and a further channel in the form of a concentric circular closed ring conducting pattern which is interconnected to the conducting patterns in the information and sprocket channels, a channel-engaging electrical contact brush per each information channel, each brush to be connected to a respective selector key in a given bank, a further brush in engagement with the closed ring channel, and a sprocket-channel-engaging brush, a rotary drive shaft for said code disk, couplable to and to be driven by the apparatus drive shaft, motion conversion means intercoupling said code disk drive shaft and the take-up-reel shaft, for irreversibly rotating the take-up-reel shaft through a fraction of one revolution as the code disk is driven through a full revolution, and a recording circuit connectable to the recording head, to the closed ring and sprocket channel brushes and to the selector key bank, for recording on magnetic tape serially by bit the bit pattern corresponding to a selected key, and longitudinally parallel therewith and transversely interspersed therewith, serial sprocket pulses, in timed relation with the apparatus drive shaft rotation.

10. As an attachment to an apparatus having a rotary drive shaft which is normally driven intermittently and for a limited number of revolutions at a time, and further having at least one bank of character-corresponding-selector keys:

a magnetic tape recording system comprising:

a magnetic tape take-up reel shaft, a magnetic tape supply-reel shaft, and therebetween a magnetic recording head, a rotary code disk having thereon plural information channels located in concentric circles in the form of angularly-spaced conducting patterns and non-conducting patterns, each channel constituting a unique serial-by-bit combination corresponding to a particular selector key character, a concentrically located "sprocket" channel having conducting patterns which are angularly interspersed with the bits in the information channels, and a further channel in the form of a concentric circular closed ring conducting pattern which is interconnected to the conducting patterns in the information and sprocket channels, a channel-engaging electrical contact brush per each information channel, each brush to be connected to a respective selector key in a given bank, a further brush in engagement with the closed ring channel, and a sprocket-channel-engaging brush, a rotary drive shaft for said code disk, couplable to and to be driven by the apparatus drive shaft, reciprocating mechanism intercoupling said code disk drive shaft and the take-up-reel shaft, for irreversibly and uni-directionally rotating the take-up-reel shaft through a fraction of one revolution as the code disk is driven through a full revolution, and a recording circuit connectable to the recording head, to the closed ring and sprocket channel brushes and to the selector key bank, for recording on magnetic tape serially by bit the bit pattern corresponding to a selected key, and longitudinally parallel therewith and transversely interspersed therewith, serial sprocket pulses, in timed relation with the apparatus drive shaft rotation.

11. As an attachment to an apparatus having a rotary shaft which is normally driven intermittently and for a limited number of revolutions at a time, and further having at least one bank of character-corresponding-selector keys:

a magnetic tape recording system comprising:

a magnetic tape take-up-reel shaft, a magnetic tape supply-reel shaft, and therebetween a magnetic recording head, a rotary code disk having thereon plural information channels located in concentric circles in the form of angularly-spaced conducting patterns and nonconducting patterns, each channel constituting a unique serial-by-bit combination corresponding to a particular selector key character, a concentrically located "sprocket" channel having conducting patterns which are angularly interspersed with the bits in the information channels, and a further channel in the form of a concentric circular closed ring conducting pattern which is interconnected to the conducting patterns in the information and sprocket channels, a channel-engaging electrical contact brush per each information channel, each brush to be connected to a respective selector key in a given bank, a further brush in engagement with the closed ring channel, and a sprocket-channel-engaging brush, a rotary drive shaft for said code disk, couplable to and to be driven by the apparatus drive shaft, including anti-backlash means for preventing code disk drive shaft rotation in the reverse direction, reciprocating mechanism intercoupling said code disk drive shaft and the take-up-reel shaft, for irreversibly and uni-directionally rotating the take-up-reel shaft through a fraction of one revolution as the code disk is driven through a full revolution, and a recording circuit connectable to the recording head, to the closed ring and sprocket channel brushes and to the selector key bank, for recording on magnetic tape serially by bit the bit pattern corresponding to a selected key, and longitudinally parallel therewith and transversely interspersed therewith, serial sprocket pulses, in timed relation with the apparatus drive shaft rotation.

12. As an attachment to an apparatus having a rotary drive shaft which is normally driven intermittently and for one revolution at a time, and further having at least one bank of character-corresponding-selector keys:

a magnetic tape recording system comprising:

a magnetic tape take-up-reel shaft, a magnetic tape supply-reel shaft, and therebetween a magnetic recording head, a rotary code disk having thereon plural information channels located in arcs of concentric circles, the arcs being intercepted by a common central angle which is less than 180°, each channel being in the form of angularly-spaced conducting patterns and nonconducting patterns, each channel constituting a unique serial-by-bit combination corresponding to a particular selector key character, and a further channel in the form of a concentric circle closed ring conducting pattern which is interconnected to the conducting patterns in the information channels, a channel-engaging electrical contact brush per each information channel, each brush to be connected to a respective selector key in a given bank, and a further brush in engagement with the closed ring channel, a rotary drive shaft for said code disk, couplable to and to be driven by the apparatus drive shaft, motion conversion means intercoupling said code disk drive shaft and the take-up-reel shaft, for irreversibly rotating the take-up-reel shaft through a fraction of one half revolution as the code disk is driven through one half revolution, and a recording circuit connectable to the recording head, to the closed ring channel brush, and to the selector key bank, for recording on magnetic tape serially by bit the bit pattern corresponding to a selected key in timed relation with the apparatus drive shaft rotation.

13. As an attachment to an apparatus having a rotary drive shaft which is normally driven intermittently and for one revolution at a time, and further having at least one bank of character-corresponding-selector keys:

a magnetic tape recording system comprising:

a magnetic tape take-up-reel shaft, a magnetic tape supply-reel shaft, and therebetween a magnetic recording head, a rotary code disk having thereon plural information channels located in arcs of concentric circles, the arcs being intercepted by a common central angle which is less than 180°, each channel being in the form of angularly-spaced conducting patterns and nonconducting patterns, each channel constituting a unique serial-by-bit combination corresponding to a particular selector key character, and a further channel in the form of a concentric circle closed ring conducting pattern which is interconnected to the conducting patterns in the information channels, a channel-engaging electrical contact brush per each information channel, each brush to be connected to a respective selector key in a given bank, a further brush in engagement with the closed ring channel, a rotary drive shaft for said code disk; couplable to and to be driven by the apparatus drive shaft, on a 1:1 basis, and including anti-blacklash means for preventing code disk drive shaft rotation in the reverse direction, a reciprocating mechanism intercoupling said code disk drive shaft and the take-up-reel shaft, for irreversibly and unidirectionally rotating the take-up-reel shaft through a fraction of one half revolution as the code disk is driven through one half revolution, and including anti-backlash means for preventing reverse movement of the take-up-reel shaft during the second half revolutions of the code disk drive shaft, a recording circuit connectable to the recording head, to the closed ring channel brush, and to the selector key bank, for recording on magnetic tape serially by bit the bit pattern corresponding to a selected key in timed relation with the apparatus drive shaft rotation.

14. As an attachment to an apparatus having a rotary drive shaft which is normally driven intermittently and for one revolution at a time, and further having at least one bank of character-corresponding-selector keys:

a magnetic tape recording system comprising:

a magnetic tape take-up-reel shaft, a magnetic tape supply-reel shaft, and therebetween a magnetic recording head assembly including at least two recording heads, a rotary code disk having thereon plural information channels located in arcs of concentric circles, the arcs being intercepted by a common central angle which is less than 180°, each channel being in the form of angularly-spaced conducting patterns and nonconducting patterns, each channel constituting a unique serial-by-bit combination corresponding to a particular selector key character, a concentrically located "sprocket" channel having conducting patterns which are angularly interspersed with the bits in the information channels and occupying an angle which is less than 180° and a further channel in the form of a concentric circle closed ring conducting pattern which is interconnected to the conducting patterns in the information and sprocket channels, a channel-engaging electrical contact brush per each information channel, each brush to be connected to a respective selector key in a given bank, a further brush in engagement with the closed ring channel, and a sprocket-channel-engaging brush, a rotary drive shaft for said code disk, couplable to and to be driven by the apparatus drive shaft, on a 1:1 basis, and including anti-backlash means for preventing code disk drive shaft rotation in the reverse direction, a reciprocating mechanism intercoupling said code disk drive shaft and the take-up-reel shaft, for irreversibly and unidirectionally rotating the take-up-reel shaft through a fraction of one half revolution as the code disk is driven through one half revolution, and including anti-backlash means for preventing reverse movement of the take-up-reel shaft during the second half revolutions of the code disk drive shaft, two recording circuits connectable to the closed ring channel brush, and respectively to one recording head and to the selector key bank on the one hand, for recording on magnetic tape serially by bit the bit pattern correspnoding to a selected key, and to the sprocket channel brush on the other hand for recording on magnetic tape, longitudinally parallel with the recorded bit pattern and transversely interspersed therewith, serial sprocket pulses, in timed relation with the apparatus drive shaft rotation.

15. As an attachment to an apparatus having a rotary drive shaft which is normally driven intermittently and for one revolution at a time, and further having at least one bank of character-corresponding-selector keys:

a magnetic tape recording system comprising:

a magnetic tape take-up reel shaft, a magnetic tape supply-reel shaft, and therebetween a magnetic recording head assembly including at least two recording heads, a rotary code disk having thereon plural information channels located in arcs of concentric circles, the arcs being intercepted by a common central angle which is less than 180°, each channel being in the form of angularly-spaced conducting patterns and nonconducting patterns, each channel constituting a unique serial-by-bit combination corresponding to a particular selector key character, a concentrically located "sprocket" channel having conducting patterns which are angularly interspersed with with the bits in the information channels and occupying an angle which is less than 180° such that a first information bit is preceded and a last information bit is followed by a "sprocket" and a further channel in the form of a concentric circle closed ring conducting pattern which is interconnected to the conducting patterns in the information and sprocket channels, a channel-engaging electrical contact brush per each information channel, each brush to be connected to a respective selector key in a given bank, a further brush in engagement with the closed ring channel, and a sprocket-channel-engaging brush.

a rotary drive shaft for said code disk, couplable to and to be driven by the apparatus drive shaft, on a 1:1 basis, and including anti-backlash means for preventing code disk drive shaft rotation in the reverse direction, a reciprocating mechanism intercoupling said code disk drive shaft and the take-up-reel shaft, for irreversibly and unidirectionally rotating the take-up-reel shaft through a fraction of one half revolution as the code disk is driven through one half revolution, and including anti-backlash means for preventing reverse movement of the take-up-reel shaft during the second half revolutions of the code disk drive shaft, two recording circuits connectable to the closed ring channel brush, and respectively to one recording head and to the selector key bank on the one hand, for recording on magnetic tape serially by bit the bit pattern corresponding to a selected key, and to the sprocket channel brush on the other hand for recording on magnetic tape, longitudinally parallel with the recorded bit pattern and transversely interspersed therewith, serial sprocket pulses, in timed relation with the apparatus drive shaft rotation.

16. As an attachment to an apparatus having a rotary drive shaft and at least one bank of character-corresponding-selector keys:

a magnetic tape recording system comprising:

a magnetic tape take-up-reel shaft, a magnetic tape supply reel shaft, and therebetween a magnetic recording head, a rotary code disk having thereon plural information channels located in concentric circles in the form of angularly-spaced conducting patterns and nonconducting patterns, each channel constituting a unique bit combination corresponding to a particular selector key character, and a further channel in the form of a concentric circular closed ring conducting pattern which is interconnected to the conducting patterns in the information channels, a channel-engaging electrical contact brush per each information channel, each brush to be connected to a respective selector key in a given bank, and a further brush in engagement with the closed ring channel, a rotary drive shaft for said code disk, couplable to and to be driven by the apparatus drive shaft, motion conversion means intercoupling said code disk drive shaft and the take-up-reel shaft, for irreversibly rotating the take-up-reel shaft through a fraction of one revolution as the code disk is driven through a full revolution, and a recording circuit connectable to the recording head, to the closed ring brush and to the selector key bank, for recording on magnetic tape the bit pattern corresponding to a selected key in timed relation with the apparatus drive shaft rotation.

17. As an attachment to an apparatus having a rotary drive shaft and at least one bank of character-corresponding-selector keys:

a magnetic tape recording system comprising:

a magnetic tape take-up-reel shaft, a magnetic tape supply-reel shaft, and therebetween a magnetic recording head, a rotary code disk having thereon plural information channels located in concentric circles in the form of angularly-spaced conducting patterns and nonconducting patterns, each channel constituting a unique bit combination corresponding to a particular selector key character, and a further channel in the form of a concentric circular closed ring conducting pattern which is interconnected to the conducting patterns in the information channels, a channel-engaging electrical contact brush per each information channel, each brush to be connected to a respective selector key in a given bank, and a further brush in engagement with the closed ring channel, a rotary drive shaft for said coke disk, couplable to and to be driven by the apparatus drive shaft, reciprocating mechanism intercoupling said code disk drive shaft and the take-up-reel shaft, for irreversibly unidirectionally rotating the take-up-reel shaft through a fraction of one revolution as the code disk is driven through a full revolution, and a recording circuit connectable to the recording head, to the closed ring brush and to the selector key bank, for recording on magnetic tape the bit pattern corresponding to a selected key in timed relation with the apparatus drive shaft rotation.

18. As an attachment to an apparatus having a rotary drive shaft and at least one bank of character-corresponding-selector keys:

a magnetic tape recording system comprising:

a magnetic tape take-up-reel shaft, a magnetic tape supply-reel shaft, and therebetween a magnetic recording head, a rotary code disk having thereon plural information channels located in concentric circles in the form of angularly-spaced conducting patterns and nonconducting patterns, each channel constituting a unique serial-by-bit combination corresponding to a particular selector key character, and a further channel in the form of a concentric circular closed ring conducting pattern which is interconnected to the conducting patterns in the information channels, a channel-engaging electrical contact brush per each information channel, each brush to be connected to a respective selector key in a given bank, and a further brush in engagement with the closed ring channel, a rotary drive shaft for said code disk, couplable to and to be driven by the apparatus drive shaft, motion conversion means intercoupling said code disk drive shaft and the take-up-reel shaft, for irreversibly rotating the take-up-reel shaft through a fraction of one revolution as the code disk is driven through a full revolution, and a recording circuit connectable to the recording head, to the closed ring brush and to the selector key bank, for recording on magnetic tape serially by bit the bit pattern corresponding to a selected key in timed relation with the apparatus drive shaft rotation.

19. As an attachment to an apparatus having a rotary drive shaft and at least one bank of character-corresponding-selector keys:

a magnetic tape recording system comprising:

a magnetic tape take-up-reel shaft, a magnetic tape supply-reel shaft, and therebetween a magnetic recording head, a rotary code disk having thereon plural information channels located in concentric circles in the form of angularly-spaced conducting patterns and nonconducting patterns, each channel constituting a unique serial-by-bit combination corresponding to a particular selector key character, and a further channel in the form of a concentric circular closed ring conducting pattern which is interconnected to the conducting patterns in the information channels, a channel-engaging electrical contact brush per each information channel, each brush to be connected to a respective selector key in a given bank, and a further brush in engagement with the closed ring channel, a rotary drive shaft for said code disk, couplable to and to be driven by the apparatus drive shaft, reciprocating mechanism intercoupling said code disk drive shaft and the take-up-reel shaft, for irreversibly and unidirectionally rotating the take-up-reel shaft through a fraction on one revolution as the code disk is driven through a full revolution, and a recording circuit connectable to the recording head, to the closed ring brush and to the selector key bank, for recording on magnetic tape serially by bit the bit pattern corresponding to a selected key in timed relation with the apparatus drive shaft rotation.

20. As an attachment to an apparatus having a rotary drive shaft and at least one bank of character-corresponding-selector keys:

a magnetic tape recording system comprising:

a magnetic tape take-up reel shaft, a magnetic tape supply-reel shaft, and therebetween a magnetic recording head, a rotary code disk having thereon plural information channels located in concentric circles in the form of angularly-spaced conducting patterns and nonconducting patterns, each channel constituting a unique serial-by-bit combination corresponding to a particular selector key character, and a further channel in the form of a concentric circular closed ring conducting pattern which is interconnected to the conducting patterns in the information channels, a channel-engaging electrical contact brush per each information channel, each brush to be connected to a respective selector key in a given bank, and a further brush in engagement with the closed ring channel, a rotary drive shaft for said code disk, couplable to and to be driven by the apparatus drive shaft, including anti-backlash means for preventing code disk drive shaft rotation in the reverse direction, reciprocating mechanism intercoupling said code disk drive shaft and the take-up-reel shaft, for irreversibly and unidirectionally rotating the take-up-reel shaft through a fraction of one revolution as the code disk is driven through a full revolution, and a recording circuit connectable to the recording head, to the closed ring brush and to the selector key bank, for recording on magnetic tape serially by bit the bit pattern corresponding to a selected key in timed relation with the apparatus drive shaft rotation.

21. As an attachment to an apparatus having a rotary drive shaft and at least one bank of character-corresponding-selector keys:

a magnetic tape recording system comprising:

a magnetic tape take-up-reel shaft, a magnetic tape supply-reel shaft, and therebetween a magnetic recording head, a rotary code disk having thereon plural information channels located in concentric circles in the form of angularly-spaced conducting patterns and nonconducting patterns, each channel constituting a unique serial-by-bit combination corresponding to a particular selector key character, a concentrically located "sprocket" channel having conducting patterns which are angularly interspersed with the bits in the information channels, and a further channel in the form of a concentric circular closed ring conducting pattern which is interconnected to the conducting patterns in the information and sprocket channels, a channel-engaging electrical contact brush per each information channel, each brush to be connected to a respective selector key in a given bank, a further brush in engagement with the closed ring channel, and a sprocket-channel-engaging brush, a rotary drive shaft for said code disk, couplable to and to be driven by the apparatus drive shaft, motion conversion means intercoupling said code disk drive shaft and the take-up-reel shaft, for irreversibly rotating the take-up-reel shaft through a fraction of one revolution as the code disk is driven through a full revolution, and a recording circuit connectable to the recording head, to the closed ring and sprocket channel brushes and to the selector key bank, for recording on magnetic tape serially by bit the bit pattern corresponding to a selected key, and longitudinally parallel therewith and transversely interspersed therewith, serial sprocket pulses, in timed relation with the apparatus drive shaft rotation.

References Cited

UNITED STATES PATENTS

| | | | |
|---|---|---|---|
| 3,103,401 | 9/1963 | Daniels | 346—74 X |
| 3,204,236 | 8/1965 | Duris | 179—90.2 X |
| 3,247,503 | 4/1966 | Stupar | 340—364 X |

BERNARD KONICK, *Primary Examiner.*

L. J. SCHROEDER, *Assistant Examiner.*

UNITED STATES PATENT OFFICE

CERTIFICATE OF CORRECTION

Patent No. 3,383,698 May 14, 1968

William D. Cohen et al.

It is certified that error appears in the above identified patent and that said Letters Patent are hereby corrected as shown below:

Column 3, line 7, "unitory" should read -- unitary --; line 11, "118" should read -- 18 --. Column 9, line 58, after "movement" cancel the comma. Column 11, line 75, after "irreversibly" insert -- uni-directionally rotating the take-up-reel shaft --. Column 15, line 1, before "shaft" insert -- drive --. Column 17, line 18, "correspnoding" should read -- corresponding --; line 42, before "the" cancel "with". Column 18, line 57, "coke" should read -- code --.

Signed and sealed this 6th day of January 1970.

(SEAL)
Attest:

EDWARD M.FLETCHER,JR.
Attesting Officer

WILLIAM E. SCHUYLER, JR.
Commissioner of Patents